United States Patent
Ítalo et al.

(10) Patent No.: US 12,340,700 B2
(45) Date of Patent: Jun. 24, 2025

(54) STOCHASTIC FLIGHT PLANNING SYSTEMS AND METHODS

(71) Applicant: THE BOEING COMPANY, Chicago, IL (US)

(72) Inventors: Romani de Oliveira Ítalo, São José dos Campos (BR); Euclides Carlos Pinto Neto, Fredericton-NB (CA); Stephen Solomon Altus, Campbell, CA (US); Rosa Maria Rodriguez, Madrid (ES); Pablo Costas Alvarez, Majadahonda Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 280 days.

(21) Appl. No.: 17/836,128

(22) Filed: Jun. 9, 2022

(65) Prior Publication Data

US 2023/0401964 A1    Dec. 14, 2023

(51) Int. Cl.
*G08G 5/32* (2025.01)
*G05D 1/00* (2006.01)
*G08G 5/25* (2025.01)

(52) U.S. Cl.
CPC ............... *G08G 5/32* (2025.01); *G05D 1/101* (2013.01); *G08G 5/25* (2025.01)

(58) Field of Classification Search
CPC ..... G08G 5/0034; G08G 5/0008; G05D 1/101
USPC .......................................................... 701/3
See application file for complete search history.

(56) References Cited

U.S. PATENT DOCUMENTS

| | | | |
|---|---|---|---|
| 8,160,995 B1 * | 4/2012 | Crawford | G01W 1/10 706/62 |
| 9,959,771 B1 * | 5/2018 | Carlson | G08G 5/0069 |
| 11,195,421 B2 | 12/2021 | Irrgang et al. | |
| 2010/0094485 A1 * | 4/2010 | Verlut | G01C 21/005 701/3 |
| 2016/0180718 A1 * | 6/2016 | Shapiro | G08G 5/0091 701/418 |
| 2016/0290817 A1 * | 10/2016 | Hoogland | G01C 23/005 |
| 2016/0343258 A1 * | 11/2016 | Navarro | G01C 21/20 |
| 2019/0340934 A1 * | 11/2019 | Villa | G08G 5/003 |
| 2020/0393852 A1 * | 12/2020 | Rozenberg | G08G 5/006 |

FOREIGN PATENT DOCUMENTS

WO    WO-2018043821 A1 *    3/2018 ............. B64C 39/02

OTHER PUBLICATIONS https://en.wikipedia.org/wiki/Ensemble_forecasting.
https://www.icao.int/airnavigation/ffice/Pages/default.aspx.
https://www.flightkeys.com/.
https://ww2.jeppesen.com/flight-planning-and-dispatch/jetplanner/.
De Oliveira, Ítalo Romani, et al. "Stochastic Flight Plan Optimization.", IEEE, 2023.(8 pages).

\* cited by examiner

*Primary Examiner* — Isaac G Smith
(74) *Attorney, Agent, or Firm* — The Small Patent Law Group LLC; Christopher R. Carroll

(57) ABSTRACT

A flight planning system and method include one or more control units configured to determine, from ensemble data, a plurality of flight plans for an aircraft from a departure location to an arrival location. The ensemble data includes an aggregation of data from multiple data sources. In at least one example, the one or more control units are further configured to determine a preferred flight plan from the plurality of flight plans.

10 Claims, 6 Drawing Sheets

STOCHASTIC FLIGHT PLANNING SYSTEMS AND METHODS

FIELD OF THE DISCLOSURE

Examples of the present disclosure generally relate to aircraft flight planning systems and methods, and more particularly to stochastic flight planning systems and methods.

BACKGROUND OF THE DISCLOSURE

Various types of aircraft are used to transport passengers and cargo between various locations. Each aircraft typically flies between different locations according to a defined flight plan or path. For example, a dispatcher may determine a particular flight plan for an aircraft between two different locations.

Airline operators seek to leverage profitability based on operational optimization. For example, flight routes with reduced fuel burn are often determined. The process of determining an optimized route is complex for several reasons, such as unpredictability of demand, unexpected events, fleet size, air traffic management considerations, and weather conditions.

Certain known flight planning systems can be susceptible to estimation errors. Although weather predictions can be accurate, even minor errors in a weather prediction can adversely affect the efficiency of a flight between two locations. Further, a weather prediction can vary depending on different factors. Long-haul flights are especially impacted by prediction errors, due to the durations of the flights, and being planned further in advance of departure. Weather estimations with longer time horizons (for example, five days or more) are less accurate than those with a shorter window (for example, within one hour).

Known flight planning systems typically use a single weather forecast to determine a flight plan. However, the weather forecast may not be entirely accurate, and may not account for weather uncertainties between locations.

SUMMARY OF THE DISCLOSURE

A need exists for an improved flight planning system and method. Further, a need exists for a flight planning system and method that is more capable of accounting for uncertainties, such as weather between different locations.

With those needs in mind, certain examples of the present disclosure provide a flight planning system including one or more control units configured to determine, from ensemble data, a plurality of flight plans for an aircraft from a departure location to an arrival location. The ensemble data includes an aggregation of data from multiple data sources. In at least one example, the one or more control units are configured to stochastically determine the plurality of flight plans from the ensemble data.

In at least one example, the one or more control units are further configured to determine a preferred flight plan from the plurality of flight plans. In at least one further example, the one or more control units are configured to stochastically determine the preferred flight plan from the plurality of flight plans. For example, the one or more control units are configured to: generate a matrix of possible flight cost outcomes including fuel consumption for the plurality of flight plans; calculate an aggregate measure of cost for each of the plurality of flight plans; and select one of the plurality of flight plans having a minimum mean fuel consumption as the preferred flight plan.

In at least one example, the one or more control units are further configured to automatically select the preferred flight plan for the aircraft.

In at least one example, the aircraft is configured to be automatically operated according to the preferred flight plan between the departure location and the arrival location.

In at least one example, the ensemble data includes ensemble weather forecast data including a plurality of weather predictions from a plurality of weather forecasting sub-systems. In at least one example, the ensemble data includes one or more of ensemble weather forecast data, payload data, runway data, or routing data.

In at least one example, each of the plurality of flight plans is authorized by air traffic management.

In at least one example, the one or more control units include artificial intelligence or are configured for machine-learning.

Certain example of the present disclosure provide a flight planning method including determining from ensemble data, by one or more control units, a plurality of flight plans for an aircraft from a departure location to an arrival location. The ensemble data includes an aggregation of data from multiple data sources. In at least one example, the flight planning method also includes determining, by the one or more control units, a preferred flight plan from the plurality of flight plans.

Certain examples of the present disclosure provide a flight planning method including determining from ensemble data, by one or more control units, a plurality of flight plans for an aircraft from a departure location to an arrival location. The ensemble data includes an aggregation of data from multiple data sources. In at least one example, the flight planning method also includes determining, by the one or more control units, a preferred flight plan from the plurality of flight plans.

DETAILED DESCRIPTION OF THE DISCLOSURE

Figure 1:
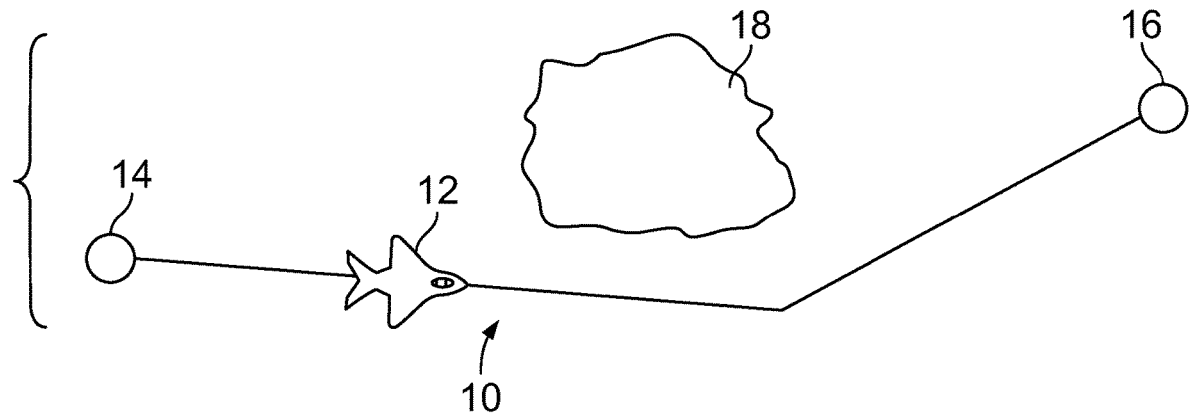
FIG. 1 illustrates a simplified view of a flight plan of an aircraft between a departure location and an arrival location.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a flight planning system and method that analyze multiple weather prediction sources in order to update flight plans in an effort to reduce fuel consumption and make critical routing decisions. The flight planning system and method includes one or more control units configured to determine one or more flight plans. In at least one example, the control unit(s) receive multiple weather predictions from multiple weather forecasting sub-systems. As such, the control unit(s) analyze ensemble weather forecast data, which includes the plurality of weather predictions. In at least one example, the control unit(s) analyze the ensemble weather forecast data, the flight plan(s), fuel consumption information, and air traffic data to identify an appropriate route between a departure location and an arrival location. An optimal flight path is identified while acknowledging uncertainty in forecasts. The optimal flight plan (including a flight route, path, or the like) is configured to produce favorable results across multiple outcomes. The flight plan is identified in advance to minimize fuel consumption along with fuel loads while providing a safety/risk assessment.

In at least one example, the flight planning systems and method generate multiple flight routes for a single vehicle. The flight routes are analyzed, and validated by air traffic management, while also factoring numerous weather forecasts along with constraints established by an airspace authority.

In at least one example, the flight planning system generates efficient robust flight plans based on the use of ensemble weather forecast, which aggregates numerous weather forecasts from numerous weather forecasting sub-systems. The ensemble weather forecast includes multiple predictions of future weather conditions rather than single values. The flight plan system takes into account all predictions to compute a flight plan according to one or more of the following criteria: (1.) The flight plan that minimizes or otherwise reduces the expected overall fuel consumption and flight cost, considering the weather uncertainties; (2.) The flight plan that minimizes or otherwise reduces the overall flight cost in an adverse weather scenario; and/or (3.) The flight plan that is less susceptible of incurring contingency fuel or fuel emergency.

Examples of the present disclosure solve the problem of reducing fuel consumption based on different and probable weather predictions. Further, such information can be summarized in a visual user-friendly approach to enable airlines to make informed decisions. The system and method reduce the risk due to error in weather forecasting for airlines and allow airlines to confidently reduce the amount of contingency fuel carried. The system and method allow dispatchers to decide which route to adopt, estimate the best, worst, and average fuel consumption levels for each option, and determine the impact on fuel consumption in case non-optimal choices are selected (for reasons other than fuel consumption).

In at least one example, the system and method use ensemble weather forecast data, a flight planning platform and air traffic constraint data, such as received from air traffic management service providers. The ensemble weather forecast data is large in volume, and airspace constraints are constantly changing. The system and method process the data and analyze it in an iterative process for generating flight plans and selecting the one best fit for a certain criterion. The fuel consumption can be assessed across numerous ensemble members and the data is presented in a direct and insightful chart. In at least one example, the system can include a set of cloud-based microservices, and can also be deployed in the cloud, thereby making it distributed, scalable and highly available.

FIG. 1 illustrates a simplified view of a flight plan 10 of an aircraft 12 between a departure location 14 (such as a first airport) and an arrival location 16 (such as a second airport). The flight plan 10 includes a route or path between the departure location 14 and the arrival location 16. The flight plan 10 can be determined to avoid inclement weather 18, such as rain, wind, snow, and/or the like.

Figure 2:
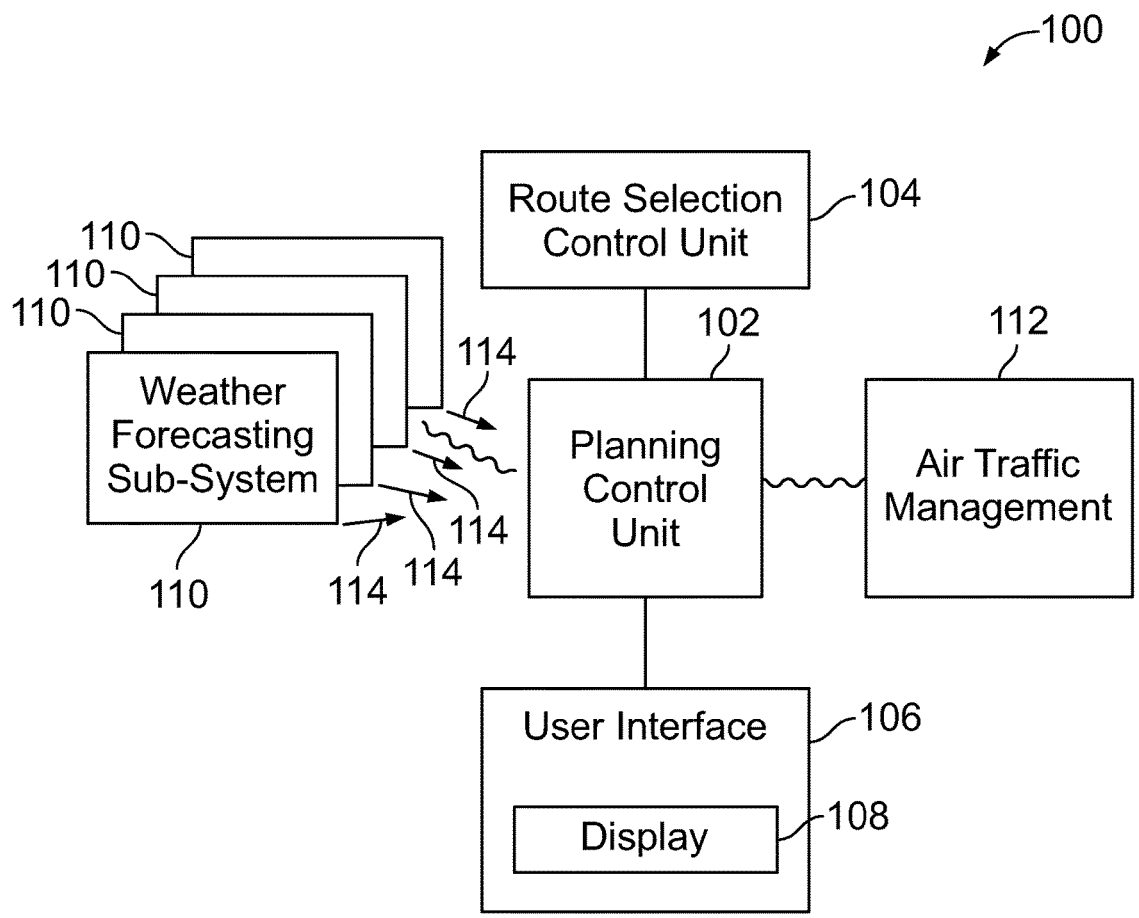
FIG. 2 illustrates a schematic block diagram of a flight planning system, according to an example of the present disclosure.

FIG. 2 illustrates a schematic block diagram of a flight planning system 100, according to an example of the present disclosure. The flight planning system 100 includes a planning control unit 102 in communication with a route selection control unit 104, such as through one or more wired or wireless connections. In at least one example, the planning control unit 102 and the route selection control unit 104 are separate and distinct from one other. In at least one other example, the planning control unit 102 and the route selection control unit 104 can be contained in a common housing, on a common integrated circuit, and/or the like. For example, a single control unit can be configured to operate the functions of the planning control unit 102 and the route selection control unit 104, as described herein.

The planning control unit 102 and/or the route selection control unit 104 are also in communication with a user interface 106, which includes a display 108. The user interface 106 can be part of a flight computer within a flight deck or cockpit of an aircraft, a computer workstation, a handheld device (such as a smart phone, smart tablet, or the like), and/or the like. The display 108 can be an electronic monitor, a television, a touchscreen interface, and/or the like. In at least one example, the planning control unit 102, the route selection control unit 104, and the user interface 106 can be part of a common system or housing, such as a flight computer, a computer workstation, a handheld device, and/or the like. In at least one other example, the user interface 106 is separate and distinct from the planning control unit 102 and the route selection control unit 104.

The planning control unit 102 is also in communication with a plurality of weather forecasting sub-systems 110, such as through one or more wired or wireless connections, internet communication, private communication networks, the cloud, and/or the like. The weather forecasting sub-systems 110 can be any type that tracks current weather and is configured to predict future weather. For example, the weather tracking sub-systems can include a Doppler radar, a weather forecasting service, and/or the like. At least one of the weather forecasting sub-systems 110 can include one or more services provided by the National Oceanic and Atmospheric Administration (NOAA).

Referring to FIGS. 1 and 2, the weather forecasting sub-systems 110 can be located at or proximate to the departure location 14 and the arrival location 16. As another example, the weather forecasting sub-systems 110 can be at least some of all of the weather forecasting sub-systems 110 between the departure location 14 and the arrival location 16. As another example, the weather forecasting sub-systems 110 can be at least some of all of the weather forecasting sub-systems 110 in a nation, continent, hemisphere, or the like. The flight planning system 100 can include more or fewer weather forecasting sub-systems 110 than shown.

The planning control unit 102 is also in communication with air traffic management 112, such as through one or more wired or wireless connections, internet communication, private communication networks, the cloud, and/or the like. The air traffic management 112 can be one or more air traffic control centers or traffic regulatory services at the departure location 14, the arrival location 16, and/or other locations.

In operation, before the aircraft 12 departs from the departure location 14 to the arrival location 16, the planning control unit 102 receives weather predictions 114 from each of the weather forecasting sub-systems 110. The weather predictions 114 include weather forecast data for one or more of the departure location 14, the arrival location 16, and locations therebetween. The weather predictions 114 include information regarding future predicted weather. The planning control unit 102 receives the weather predictions 114 before the aircraft 12 departs the departure location 14. For example, the planning control unit 102 receives the weather predictions a week before departure, a day before departure, an hour before departure, and/or the like. The planning control unit 102 can receive multiple weather predictions 114 from each of the weather forecasting sub-systems 110 over a predetermined period of time, such as a month, a week, a day, an hour, and/or the like before departure of the aircraft 12 from the departure location 14. Each of the weather predictions 114 can include at least some differences from one another. In this manner, the planning control unit 102 aggregates the weather predictions 114 into ensemble weather forecast data. By aggregating numerous weather predictions 114 from a plurality of weather forecasting sub-systems 110 into the ensemble weather forecast data, the planning control unit 102 can more accurately determine the weather between the departure location 14 and the arrival location 16. For example, common aspects among all of the weather predictions 114 can be used by the planning control unit 102 to provide a better prediction of the weather, while outlying aspects of certain weather predictions 114 can be discarded.

The ensemble weather forecast data is an example of ensemble data that can be used by one or more control units (such as the planning control unit 102) to stochastically determine a plurality of flight plans. Other examples of ensemble data include payload data, runway data, routing data, and the like. The ensemble data can include multiple types. For example, the ensemble data can include at least two of weather forecast data, payload data, runway data, routing data, and/or the like.

The planning control unit 102 analyzes the ensemble weather forecast data including the plurality of weather predictions 114 from the plurality of weather forecasting sub-systems 110 to stochastically determine locations of inclement weather to avoid. Based on the ensemble weather forecast data, the planning control unit 102 then determines a plurality of flight plans between the departure location 14 and the arrival location 16. The plurality of flight plans can be based on various different preferences, such as avoidance of the inclement weather, fastest time to the arrival location 16 (whether or not inclement weather is avoided), lowest or reduced fuel burn (whether or not inclement weather is avoided), and/or the like.

The planning control unit 102 then communicates with the air traffic management 112 to determine whether each of the plurality of flight plans is authorized. For example, the planning control unit 102 receives data from the air traffic management 112 regarding restricted air space, restricted flight times at certain locations, and/or the like. If a flight plan violates a restriction (such as a restricted air space, time, or the like), the planning control unit 102 discards the flight plan as a potential flight plan. If, however, the determined flight plans are authorized by the air traffic management 112, the planning control unit 102 determines that the flight plans are authorized for selection.

The route selection control unit 104 analyzes the flight plans, as determined by the planning control unit 102 and authorized by the air traffic management 112, and can show them on the display 108 of the user interface 106. An operator (such as a pilot) can select one of the flight plans based on preference, such as lowest fuel burn, quickest time to the arrival location, and/or the like. In at least one example, the route selection control unit 104 can automatically select one flight plan from the plurality of flight plans based on information input by the operator into the user interface 106. For example, an operator may use an input device (such as a keyboard, mouse, stylus, microphone, touchscreen interface, and/or the like) to indicate that the selected flight plan be no less than 10, 20, 50, 100, or the like miles from inclement weather, lowest possible fuel burn, shortest time to arrival location, and/or the like. Based on the input information, the route selection control unit 104 can then automatically select the flight plan among the plurality of flight plans determined by the planning control unit 102.

In at least one example, the aircraft 12 can then be automatically flown between the departure location 14 and the arrival location 16 based on the flight plan that is selected from the plurality of flight plans. For example, the flight computer receives data regarding the selected flight plan, such as from the planning control unit 102 and/or the route selection control unit 104, and automatically operates the aircraft 12 (with no or reduced input from a pilot) according to the selected flight plan. In this manner, the aircraft 12 can be operated by an auto-pilot system according to the selected flight plan.

In at least one example, the planning control unit 102 can determine the flight plans (and the route selection control unit 104 can select one of the flight plans) based on stochastic processes. That is, the planning control unit 102 and/or the route selection control unit 104 can be part of a stochastic flight planning system. In stochastic flight planning, the planning control unit 102 determines the plurality of flight plans, as described herein. The flight plans can be based on and/or evaluated in relation to the ensemble weather forecast data. The flight plans determined by the planning control unit 102 can be validated by the air traffic management 112, as described herein. For example, the planning control unit 102 determines, based on information received from the air traffic management, if the flight plans fulfill airspace rules and constraints imposed by an air space and/or regulatory authority, and if the flight plans four-dimensional trajectories can be accommodated by flow management constraints and expected flow and congestion conditions. For example, a system to enable the exchange of such validation data is Flight and Flow Information for a Collaborative Environment (FF-ICE), which is a standard defined by the International Civil Aviation Organization (ICAO) and implemented by EuroControl, and the U.S. Federal Aviation Administration (FAA).

In contrast to the examples of the present disclosure described herein, known deterministic approaches to flight planning use a single forecast and are significantly impacted by the differences between the actual and the predicted weather states. Further, known deterministic approaches typically do not utilize FF-ICE validation, which causes flight dispatchers to engage in a time-consuming trial-and-error process, as the known deterministic approaches cannot be quickly adapted to consider the large variety of airspace constraints that are created and discarded each day.

As described herein, the flight planning system 100 includes one or more control units configured to determine (for example, stochastically) a plurality of flight plans from ensemble data. The ensemble data includes an aggregation of data from multiple data sources. In at least one example, each of the multiple data sources is the same type of data source. For example, the ensemble data is ensemble weather forecast data that is an aggregation of numerous weather predictions from a plurality of weather forecasting subsystems 110. In at least one example, the one or more control units are further configured to determine (for example, stochastically) a preferred flight plan from the plurality of flight plans.

Figure 3:
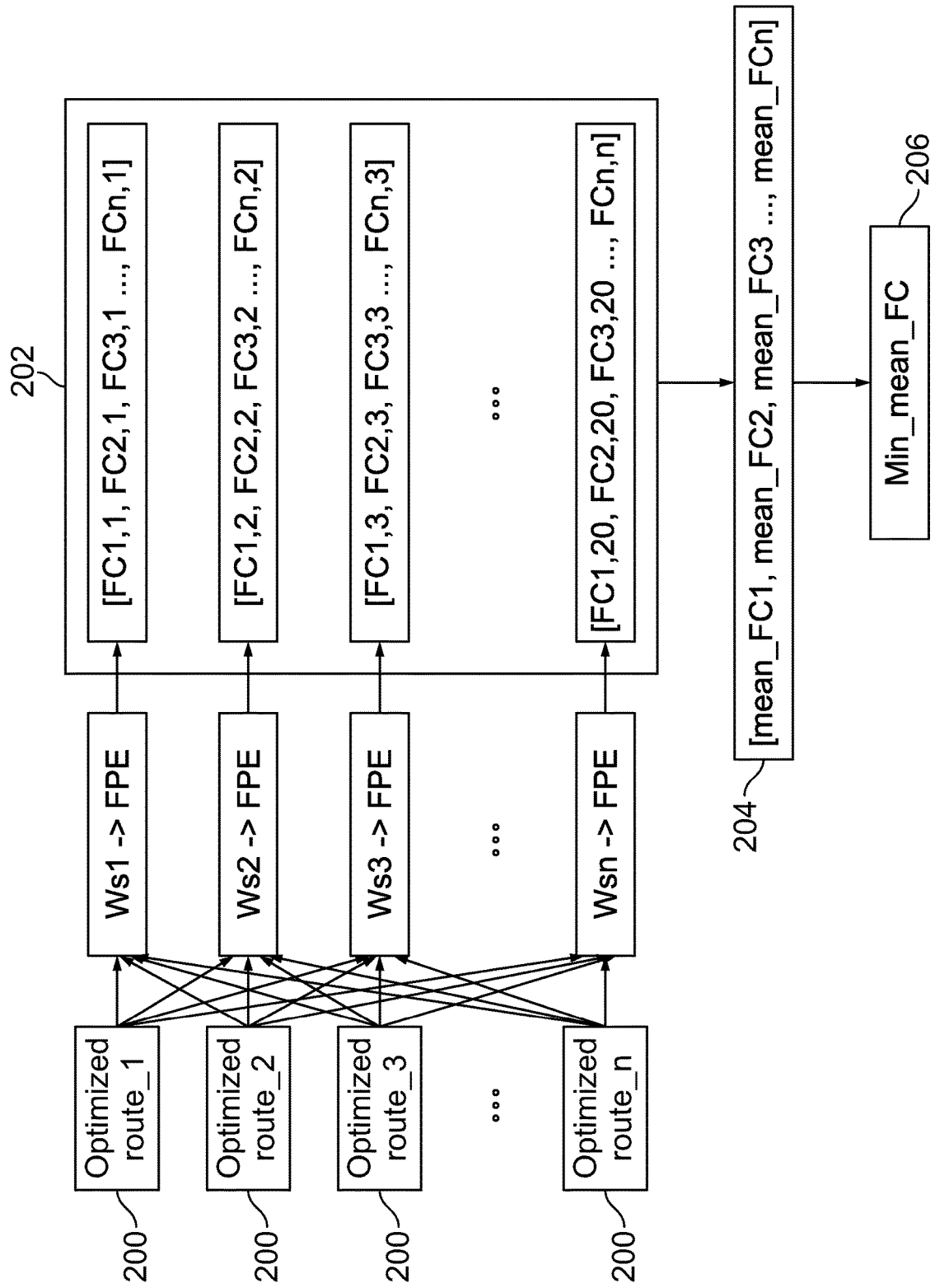
FIG. 3 illustrates a flow chart of a method of selecting a preferred flight plan, according to an example of the present disclosure.

FIG. 3 illustrates a flow chart of a method of selecting a preferred flight plan, according to an example of the present disclosure. Referring to FIGS. 2 and 3, the planning control unit 102 determines or otherwise generates a plurality of flight plans 200, such as optimized routes. The route selection control unit 104 can operate based on various approaches to select a preferred flight plan via stochastics. An example of a stochastic method for selecting the preferred flight plan is cross-optimization, which is illustrated in FIG. 3. In cross-optimization, the route selection control unit 104 evaluates the flight plans 200, which are determined by the planning control unit 102. The route selection control unit 104 generates a matrix 202 of possible fuel consumption (FC) outcomes. Next, the route selection control unit 104 calculates a mean FC 204 for each flight plan. Then, the route selection control unit 104 selects the flight plan with the minimum mean FC 206 as the preferred flight plan. Optionally, the route selection control unit 104 can stochastically determine a preferred flight plan through one or more other stochastic processes other than cross-optimization. As described herein, in at least one example, the route selection control unit 104 is configured to stochastically select the preferred flight plan from a plurality of flight plans determined by the planning control unit 102. In at least one example, an aggregate measure of cost (such as for fuel consumption) can be calculated. The aggregate measure of cost can include a mean, a median, a minimum, a maximum, and/or the like cost.

As described herein, the flight planning system 100 includes one or more control units (such as the planning control unit 102 and/or the route selection control unit 104) that determines (for example, generates, produces, or the like) and evaluates multiple flight plans, which can be based on input provided by an airline operator (for example, flight missions and departure times/dates). In at least one example, the route selection control unit 104 stochastically determines (such as via cross-optimization) a preferred flight plan from the plurality of flight plans. The flight planning systems and methods described herein allow airline operators to make better informed decisions and assess the impacts of choosing different flight plans.

In at least one example, the planning control unit 102 continuously receives weather predictions 114 up until a departure time for the aircraft 12. The planning control unit 102 can automatically determine fuel consumption and profitability estimation for each of the flight plans, thereby allowing individuals to evaluate profit variability for the different flight plans based on different weather predictions. The costs and fuel consumption of the flight plans can be estimated by the planning control unit 102 based on the use of flight planning platforms.

Figure 4:
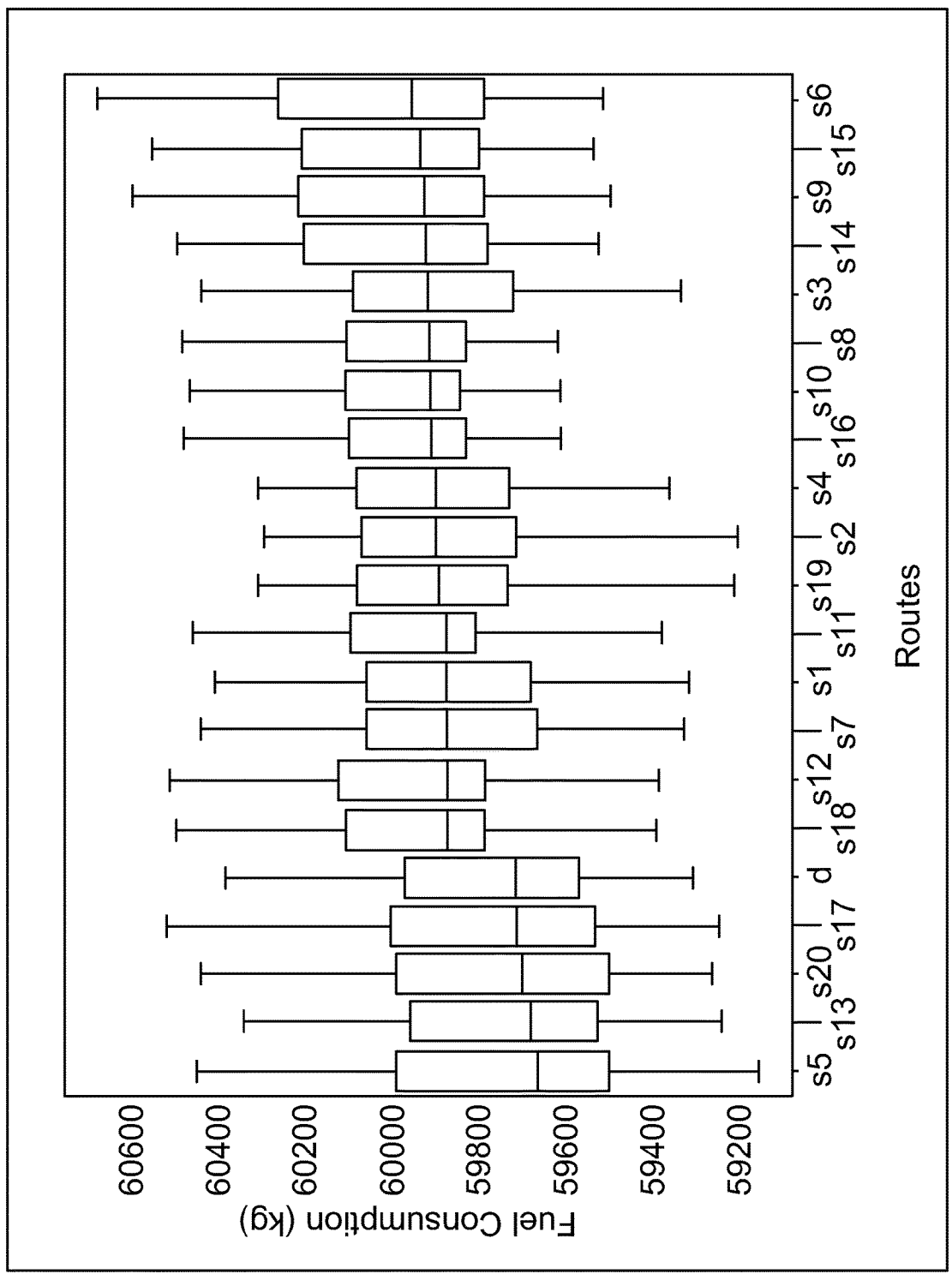
FIG. 4 illustrates a chart of performance of different plans between a departure location and an arrival location, according to an example of the present disclosure.

FIG. 4 illustrates a chart of performance of different plans between a departure location and an arrival location, according to an example of the present disclosure. Referring to FIGS. 1-4, the planning control unit 102 can determine profitability estimates for each of the flight plans (or routes) based on the chart shown in FIG. 4. For example, fuel consumption for each flight plan can be determined. The fuel consumption for each flight plan can then be compared in relation to those of the other flight plans. The planning control unit 102 can determine profitability estimates for the flight plans based on multiple schedules and several ensemble factors (for example, several weather predictions).

In at least one example, the planning control unit 102 determines the flight plans based on various weather predictions. Optionally, and/or additionally, the planning control unit 102 can stochastically determine the flight plans based on other ensemble factors, such as payload predictions (for example, aircraft can have different overall weight based on passengers missing a flight, not connecting in time to make a flight, and/or the like), runway variability (for example, airports can have multiple runways, and the flight plans can vary depending on which runways are used), route variability (for example, air traffic control can require certain routes into an airport based on air traffic, weather, or the like), and/or the like. The planning control unit 102 stochastically determines the flight plans based on one or more ensemble factors, which may have a random probability distribution or pattern that can be statistically analyzed (but not precisely predicted). The ensemble factors include one or more of weather, payload of an aircraft, runway at a departure location and/or arrival location, traffic routing by air traffic control, and/or the like.

In at least one example, the flight planning system 100 includes one or more control units (such as the planning control unit 102 and/or the route selection control unit 104) that is configured to estimate fuel consumption and profitability with different time horizons, thereby allowing for flexibility until a time of departure. In at least one example, the flight planning system also provides a user-friendly summary of fuel consumption estimations to support decision making. For example, FIG. 4 shows the performance of different flight plans in terms of fuel consumption. As shown in FIG. 4, although flight plan s5 presents a median fuel consumption, the maximum fuel consumption is greater than that of flight plan s13. The chart shown in FIG. 4 can be shown on the display 108 (shown in FIG. 2, for example). Such information allows operators to make informed decision regarding which flight plan to use and outcomes to expect in each case.

Figure 5:
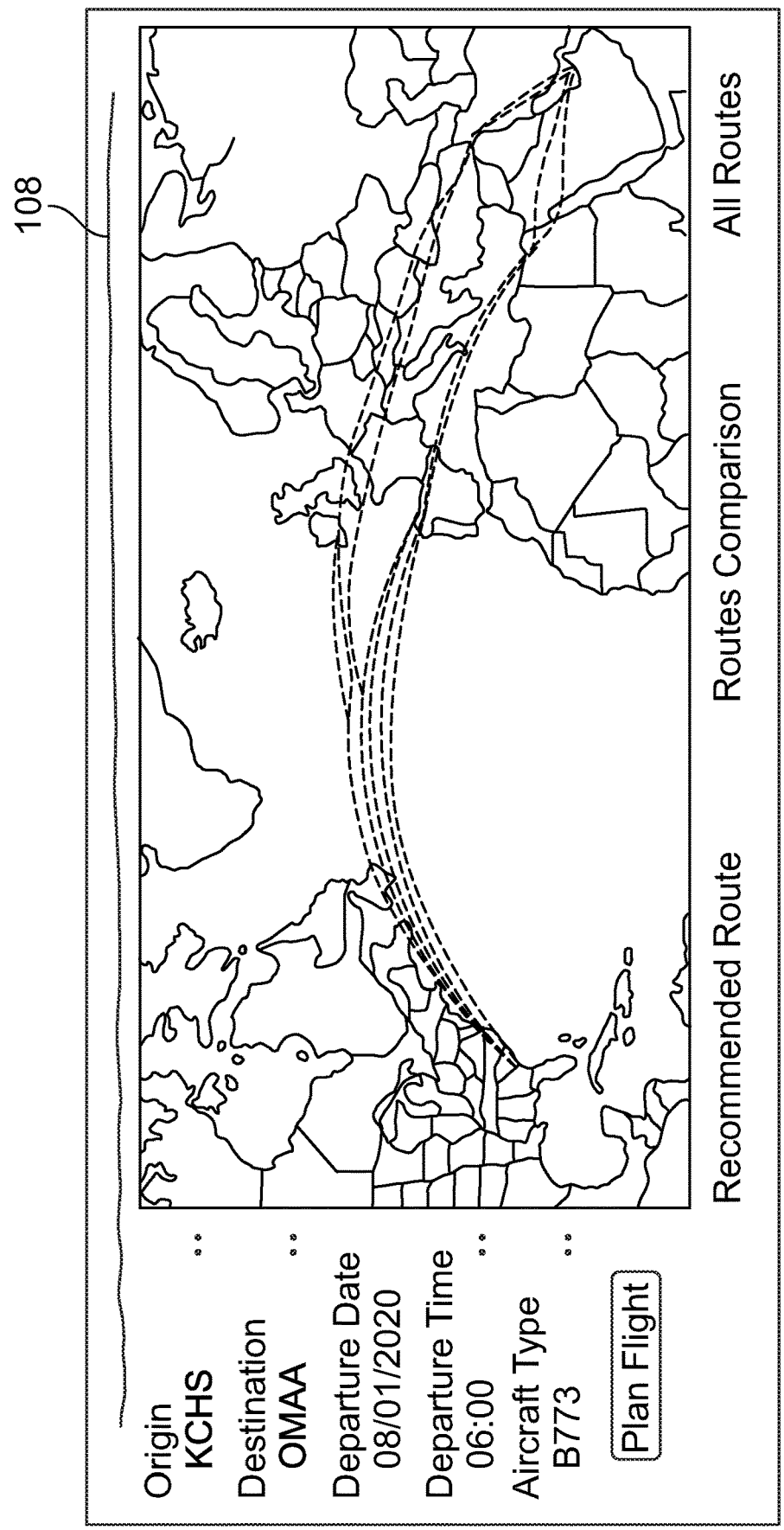
FIG. 5 illustrates a front view of a display, according to an example of the present disclosure.

FIG. 5 illustrates a front view of the display 108, according to an example of the present disclosure. As shown in FIG. 4, the display 108 can be used to integrate relevant information and simplifies the decision-making process. An operator can view the information shown on the display 108 to provide inputs that can be used by the planning control unit 102 to determine the flight plans, and the route selection control unit 104 to determine a preferred one of the flight plans. After the planning control unit 102 determines the flight plans, the planning control unit 102 can show the possible flight plans on the display 108.

It has been found that the stochastic flight planning systems and methods described herein outperform known determinist approaches. The flight planning system 100 uses a data-driven stochastic approach, rather than a model-based deterministic approach. As such, the flight planning system 100 accounts for uncertainties when computing predicted values. Furthermore, the flight planning system 100 can be configured to estimate profit and fuel consumption of different flight plans with high flexibility and different time horizons.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the planning control unit 102 and the route selection control unit 104 may be or include one or more processors (for example, multiple parallel processors) that are configured to control operation thereof, as described herein.

The planning control unit 102 and the route selection control unit 104 are configured to execute a set of instructions that are stored in one or more data storage units or elements (such as one or more memories), in order to process data. For example, the planning control unit 102 and the route selection control unit 104 may include or be coupled to one or more memories. The data storage units may also store data or other information as desired or needed. The data storage units may be in the form of an information source or a physical memory element within a processing machine.

The set of instructions may include various commands that instruct the planning control unit 102 and the route selection control unit 104 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the planning control unit 102 and the route selection control unit 104. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the planning control unit 102 and the route selection control unit 104 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 6:
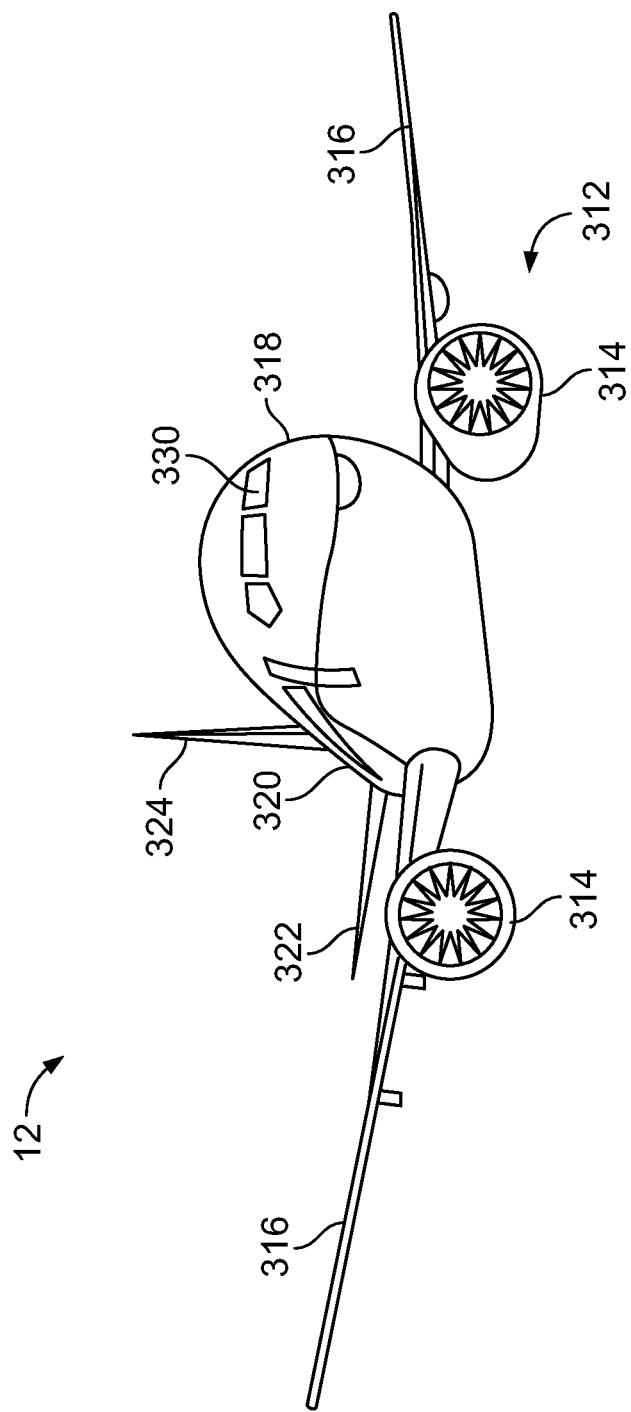
FIG. 6 illustrates a front perspective view of an aircraft, according to an example of the present disclosure.

FIG. 6 illustrates a front perspective view of an aircraft 12, according to an exemplary embodiment of the present disclosure. The aircraft 12 includes a propulsion system 312 that can include two turbofan engines 314, for example. Optionally, the propulsion system 312 can include more engines 314 than shown. The engines 314 are carried by wings 316 of the aircraft 12. In other examples, the engines 314 can be carried by a fuselage 318 and/or an empennage 320. The empennage 320 can also support horizontal stabilizers 322 and a vertical stabilizer 324. The fuselage 318 of the aircraft 12 defines an internal cabin, which may include a flight deck or cockpit 330 that includes a flight computer, for example. Further, the planning control unit 102, the route selection control unit 104, and the user interface 106 (shown in FIG. 2) can be within the flight deck cockpit 330.

The aircraft 12 may be sized, shaped, and configured other than shown in FIG. 6. For example, the aircraft 12 may be a non-fixed wing aircraft, such as a helicopter. As another example, the aircraft 12 can be an unmanned aerial vehicle (UAV).

Figure 7:
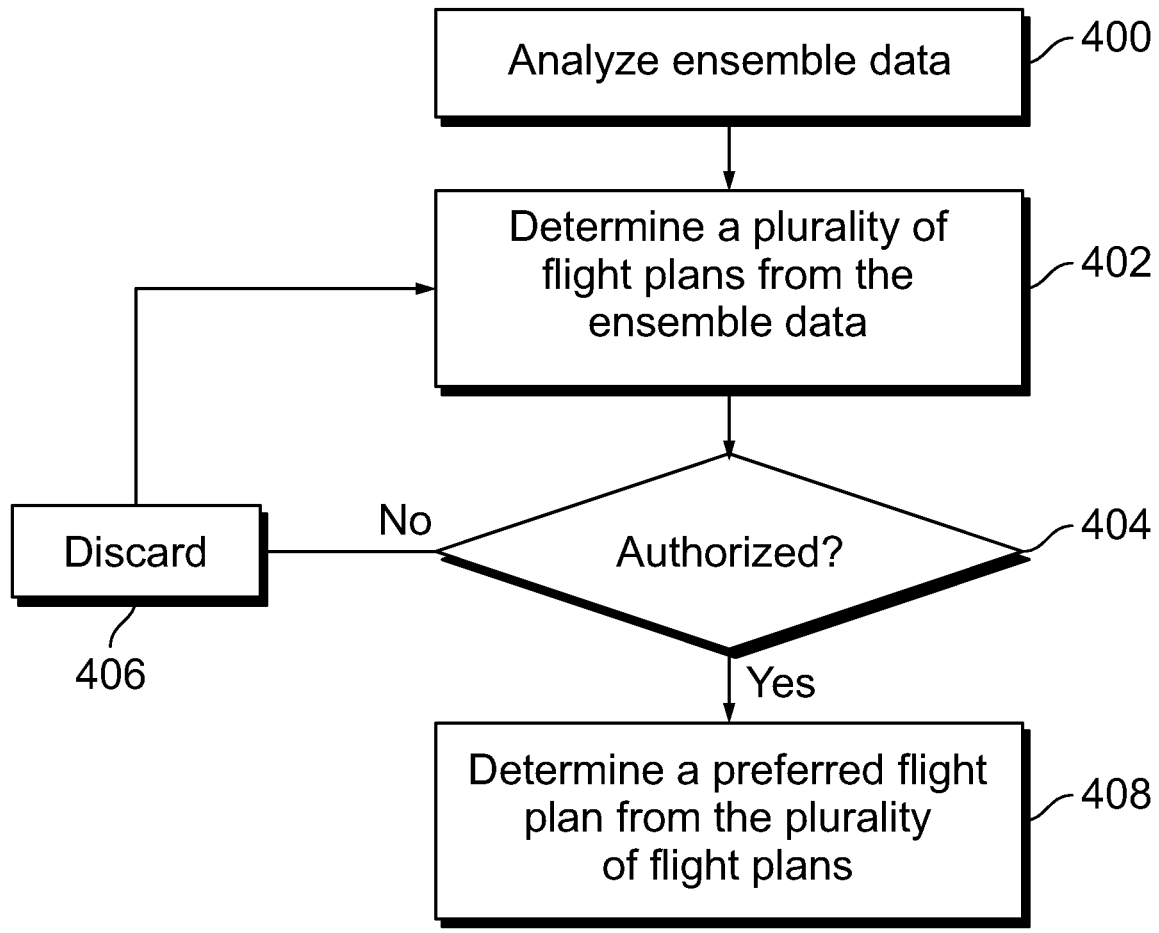
FIG. 7 illustrates a flow chart of a flight planning method, according to an example of the present disclosure.

FIG. 7 illustrates a flow chart of a flight planning method, according to an example of the present disclosure. Referring to FIGS. 2 and 7, at 400, the one or more control units (such as the planning control unit 102) analyzes ensemble data. The ensemble data is data that is aggregated from a plurality of sources. For example, the ensemble data is ensemble weather forecast data that includes a plurality of weather predictions 114 from a plurality of weather forecasting sub-systems 110. As another example, the ensemble data is payload forecast data for an aircraft that is aggregated from previous flights, current flight schedules and delays, and/or the like. As another example, the ensemble data is runway data for one or more airports, which can be aggregated from historical records of flight patterns and routing over a predetermined period of time. As another example, the ensemble data is routing data for aircraft out of and into airports, which can be aggregated from historical records.

At 402, the one or more control units determine a plurality of flight plans from the ensemble data. In at least one example, the one or more control units stochastically determine the plurality of flight plans from the ensemble data. At 404, the one or more control units determine if each of the plurality of flight plans is authorized, such as through communication with the air traffic management 112. If a particular flight plan is not authorized, the particular flight plan is discarded at 406, and the method may return to 402. If the flights plans are authorized at 404, the method proceeds to 408, at which the one or more control unit (such as the route selection control unit 104) determines a preferred flight plan from the plurality of flight plans. In at least one example, the one or more control units stochastically determine the preferred flight plan. The preferred flight plan can be presented to an operator, such as on the display 108.

The operator may affirmatively select the preferred flight plan. Optionally, the one or more control units can automatically select the preferred flight plan. The aircraft can be automatically flown according to the preferred flight plan.

In at least one example, all or part of the systems and methods described herein may be or otherwise include an artificial intelligence (AI) or machine-learning system that can automatically perform the operations of the methods also described herein. For example, the planning control unit 102 and/or the route selection control unit 104 can be an artificial intelligence or machine learning system. These types of systems may be trained from outside information and/or self-trained to repeatedly improve the accuracy with how samples are analyzed in relation to standards. Over time, these systems can improve by determining flight plans and/or preferred flight plans with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), or the like. The systems may be trained and re-trained using feedback from one or more prior analyses of flight plans, ensemble data, and/or other such data. Based on this feedback, the systems may be trained by adjusting one or more parameters, weights, rules, criteria, or the like, used in the analysis of the same. This process can be performed using flight plans and ensemble data instead of training data, and may be repeated many times to repeatedly improve the determination of flight plans and/or preferred flight plans. The training of the record matching system minimizes conflicts and interference by performing an iterative training algorithm, in which the systems are retrained with an updated set of data and based on the feedback examined prior to the most recent training of the systems. This provides a robust analysis model that can better determine whether flight plans and/or preferred flight plans are viable, accurate, efficient, and the like.

Referring to FIGS. 1-7, examples of the present disclosure provide systems and methods that allow large amounts of data to be quickly and efficiently analyzed by a computing device. For example, ensemble data (such as weather data, payload data, runway data, routing data, and/or the like) may be received from hundreds, thousands, or more sources. As such, large amounts of data are being tracked and analyzed. The vast amounts of data are efficiently organized and/or analyzed by control units, as described herein. The control unit(s) analyze the data in a relatively short time in order to quickly and efficiently output and/or flight plans and/or preferred flight plans. A human being would be incapable of efficiently analyzing such vast amounts of data in such a short time. As such, examples of the present disclosure provide increased and efficient functionality with respect to prior computing systems, and vastly superior performance in relation to a human being analyzing the vast amounts of data. In short, examples of the present disclosure provide systems and methods that analyze thousands, if not millions, of calculations and computations that a human being is incapable of efficiently, effectively and accurately managing.

Further, the disclosure comprises examples according to the following clauses:

Clause 1. A flight planning system comprising:
one or more control units configured to determine, from ensemble data, a plurality of flight plans for an aircraft from a departure location to an arrival location, wherein the ensemble data includes an aggregation of data from multiple data sources.

Clause 2. The flight planning system of Clause 1, wherein the one or more control units are configured to stochastically determine the plurality of flight plans from the ensemble data.

Clause 3. The flight planning system of Clauses 1 or 2, wherein the one or more control units are further configured to determine a preferred flight plan from the plurality of flight plans.

Clause 4. The flight planning system of Clause 3, wherein the one or more control units are configured to stochastically determine the preferred flight plan from the plurality of flight plans.

Clause 5. The flight planning system of Clause 4, wherein the one or more control units are configured to:
generate a matrix of possible flight cost outcomes including fuel consumption for the plurality of flight plans;
calculate an aggregate measure of cost for each of the plurality of flight plans; and
select one of the plurality of flight plans having a minimum mean fuel consumption as the preferred flight plan.

Clause 6. The flight planning system of any of Clauses 3-5, wherein the one or more control units are further configured to automatically select the preferred flight plan for the aircraft.

Clause 7. The flight planning system of any of Clauses 3-6, wherein the aircraft is configured to be automatically operated according to the preferred flight plan between the departure location and the arrival location.

Clause 8. The flight planning system of any of Clauses 1-7, wherein the ensemble data comprises ensemble weather forecast data including a plurality of weather predictions from a plurality of weather forecasting sub-systems.

Clause 9. The flight planning system of any of Clauses 1-8, wherein the ensemble data comprises one or more of ensemble weather forecast data, payload data, runway data, or routing data.

Clause 10. The flight planning system of any of Clauses 1-9, wherein each of the plurality of flight plans is authorized by air traffic management.

Clause 11. The flight planning system of any of Clauses 1-10, wherein the one or more control units comprise artificial intelligence or are configured for machine-learning.

Clause 12. A flight planning method comprising:
determining from ensemble data, by one or more control units, a plurality of flight plans for an aircraft from a departure location to an arrival location, wherein the ensemble data includes an aggregation of data from multiple data sources.

Clause 13. The flight planning method of Clause 12, wherein said determining comprises stochastically determining the plurality of flight plans from the ensemble data.

Clause 14. The flight planning method of Clauses 12 or 13, further comprising determining, by the one or more control units, a preferred flight plan from the plurality of flight plans.

Clause 15. The flight planning method of Clause 14, wherein said determining the preferred flight plan comprises stochastically determining the preferred flight plan from the plurality of flight plans.

Clause 16. The flight planning method of Clause 15, wherein said stochastically determining comprises:

generating a matrix of possible flight cost outcomes including fuel consumption for the plurality of flight plans;

calculating an aggregate measure of cost for each of the plurality of flight plans; and selecting one of the plurality of flight plans having a minimum mean fuel consumption as the preferred flight plan.

Clause 17. The flight planning method of any of Clauses 14-16, further comprising, automatically selecting, by the one or more control units, the preferred flight plan for the aircraft.

Clause 18. The flight planning method of any of Clauses 14-17, further comprising automatically operating the aircraft according to the preferred flight plan between the departure location and the arrival location.

Clause 19. The flight planning method of any of Clauses 12-18, wherein the ensemble data comprises ensemble weather forecast data including a plurality of weather predictions from a plurality of weather forecasting sub-systems.

Clause 20. A non-transitory computer-readable storage medium comprising executable instructions that, in response to execution, cause one or more control units comprising a processor, to perform operations comprising:

stochastically determining from ensemble data, by one or more control units, a plurality of flight plans for an aircraft from a departure location to an arrival location, wherein the ensemble data includes an aggregation of data from multiple data sources; and stochastically determining a preferred flight plan from the plurality of flight plans.

As described herein, examples of the present disclosure provide improved flight planning systems and methods. Further, examples of the present disclosure provide flight planning systems and methods that account for uncertainties, such as weather between different locations.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method comprising:

receiving different weather predictions from weather forecasting sub-systems located at a departure location of an aircraft and an arrival location for the aircraft;

identifying common aspects of the different weather predictions;

discarding outlying aspects of the different weather predictions;

determining, using one or more control units, a plurality of flight plans for an aircraft from the departure location to the arrival location, the plurality of flight plans determined from ensemble data that includes the common aspects of the different weather predictions and that does not include the outlying aspects of the different weather predictions;

selecting a preferred flight plan from the plurality of flight plans; and automatically operating, with a flight computer, the aircraft according to the preferred flight plan between the departure location and the arrival location.

2. The method of claim 1, wherein said determining comprises stochastically determining the plurality of flight plans from the ensemble data.

3. The method of claim 1, wherein said selecting the preferred flight plan comprises:

generating a matrix of possible flight cost outcomes of fuel consumption for the plurality of flight plans; and calculating an aggregate measure of fuel consumption cost for each of the flight plans, wherein the preferred flight plan is selected as having a minimum mean fuel consumption cost of the flight plans in the plurality of flight plans.

4. The method of claim 1, wherein the preferred flight plan for the aircraft is automatically selected by the one or more control units.

5. The method of claim 1, wherein receiving the different weather predictions includes receiving two or more of the different weather predictions from each of the weather forecasting sub-systems at different time periods before departure of the aircraft from the departure location.

6. The method of claim 1, wherein the preferred flight plan is selected based on a fastest time to the arrival location among the flight plans in the plurality of flight plans regardless of whether an inclement weather forecast is avoided.

7. The method of claim 1, wherein selecting the preferred flight plan includes discarding one or more of the flight plans in the plurality of flight plans based on one or more of restricted air space or restricted flight time.

8. The method of claim 1, wherein the preferred flight plan is selected based also on a minimum distance from inclement weather predicted by the ensemble data.

9. The method of claim 1, wherein the preferred flight plan is selected based also on a lowest fuel burn of the aircraft among the flight plans in the plurality of flight plans.

10. The method of claim 1, wherein the preferred flight plan is selected based also on a shortest time to arrival at the arrival location among the flight plans in the plurality of flight plans.

\* \* \* \* \*